Patented May 12, 1953

2,638,456

UNITED STATES PATENT OFFICE 2,638,456

PLASTIC COMPOUND CONTAINING SYNTHETIC RUBBER AND ANTHRACITE COAL

Edwin R. Laning, Langhorne, Pa., assignor to The Stokes Molded Products, Inc., a corporation of New Jersey No Drawing. Application June 9, 1949, Serial No. 98,155

4 Claims. (Cl. 260—5)

This invention relates to plastic compounds of low cost which possess highly desirable properties which make them useful for many applications, particularly for molded products, such as containers for storage batteries.

In many applications where cost is of prime importance, such as quantity production of storage battery containers, it is necessary that the plastic compound of which the containers are made shall possess certain properties to insure maximum safety in the use thereof. For example, in a storage battery container there must be adequate impact strength to guard against damage and resultant leakage of acid or other corrosive electrolyte. The walls must be sufficiently rigid at high temperature so that they will not soften and bulge and otherwise wedge against supporting frames, and of course the compound must be chemically inert with respect to the electrolyte and other materials with which the containers may come in contact.

Heretofore storage battery containers have been made from raw rubber or reclaimed rubber, including various fillers, plasticizers and accelerators. With such compositions of the prior art, the cost of rubber, both the crude and reclaimed, is relatively high and the amount required for a satisfactory product is disproportionately high as compared with the amount and cost of the plastic compounds forming the subject matter of the present invention.

In accordance with the present invention, the plastic compound preferably comprises a synthetic rubber of the type which can be vulcanized to hard rubber, mixed with other ingredients which will be discussed hereinafter. Preferably the synthetic rubber is of the butadiene-styrene type, generally known to those skilled in the art as GR–S (Government Reserve Synthetic Rubber). The GR–S rubber is preferred due to its low unit cost, though other synthetics may be utilized, such as of the acrylo-nitrile type. By using a synthetic rubber of the foregoing type it has been found that there may be utilized in mixture therewith a filler comprising powdered anthracite coal, having particle sizes ranging from that which will pass through an 80-mesh screen to that which will pass through a 325-mesh screen. The particle size is not critical, though powdered anthracite coal which will pass through a 100-mesh screen has been found to be highly satisfactory. If smaller particle sizes predominate, it will, of course, be understood that a substantial quantity of the material may have particles which will just pass through an 80-mesh screen and there may be a fraction somewhat larger than will pass through an 80-mesh screen. On the other hand, if a predominant quantity of the filler is of the larger particle size, which will not pass through a 100-mesh screen, the remaining part of the filler material may comprise the smaller particles which will pass through a screen somewhat finer than, or above, the 200-mesh screen.

With synthetic rubber comprising up to 25 parts of the compound, the filler of powdered anthracite coal, may comprise as high as approximately 300 parts. The particles of powdered anthracite coal used as the filler is an exceedingly low-cost by-product from the mines. Such powdered coal filler, for example 270 parts with the synthetic type of rubber of 22.5 parts, mixes therewith in unexpectedly large proportions, reducing the cost of the final product which possesses unexpected improved characteristics, later to be set forth.

With the foregoing proportions there may also be included approximately 7.5 to 10.5 parts of crude rubber. The crude rubber is not considered essential; it has been omitted in some cases and a satisfactory product has been obtained. On the other hand, such a small percentage of crude rubber has been found satisfactory and is desirable since it is less costly than the synthetic rubber, particularly the grade known as rolled brown crepe or flatbark. The mixture for the compound also contains sulphur ranging from 5 to 15 parts, a plasticizer available on the market under the trade name of Dutrex 6 in amounts ranging from 41 to 53 parts and comprising a liquid high molecular weight petroleum hydrocarbon product having the following characteristics:

Viscosity at 100° F., 5800 cs.
Initial boiling point, °F. over 600 (over 400 at 1 mm.)
Specific gravity, 20/4 C., 1.016
Bromine No. (g. Br/100 g.), 26

The mixture for the compound also includes an accelerator or activator which may be lime, light calcined magnesia, or zinc oxide, 1½ parts, the lime being preferred, principally as a matter of cost. It has also been found that it is highly desirable to include an organic accelerator generally available on the market under the designation accelerator "808," an accelerator of the aldehyde amine type and comprising a butyraldehyde-aniline condensation product, 1 part. The proportion of accelerator activator and of the organic accelerator portions may be varied from the suggested 1½ parts and 1 part, though on a product and cost basis the proportions stated have been found satisfactory. Other organic accelerators may be used, such as diorthotolylguanidine, or diphenylguanidine.

The organic accelerator "808" has been found to exhibit unexpected properties in connection with the GR-S synthetic rubber in that it not only retards curing during mixing but is also highly effective in accelerating curing during the pressing or molding of the compound. It is to be understood the foregoing ingredients are mixed together on the conventional rubber mill, or preferably a Banbury mixer, for a time adequate to insure intimate mixing of all the ingredients, the mixture then being transferred to the presses for final pressing of the product or it may be fed to an extruding machine for extrusion of the desired product therefrom, or to calender rolls for manufacture of sheet material, or for such other purposes for which it is desired to use the final product.

Further in accordance with the invention, the plastic compound may be formed with further variations in the ingredients, such as by increasing the relative proportion of the crude rubber with respect to the synthetic rubber. However, the total rubber content remains low relative to the remaining ingredients. With the following mixture, a product with satisfactory properties of near minimum cost, based upon present relative costs of the materials may be produced. The ingredients and their proportions are as follows:

| Ingredients: | Parts by weight |
| --- | --- |
| Crude rubber | 10.5 |
| GR-S | 10.5 |
| Sulphur | 4 to 11 |
| Dutrex | 52.5 |
| Powdered anthracite coal filler | 287 |
| Accelerator activator (lime) | 1 |
| Organic accelerator (808) | 0.75 |

It has been found preferable to first mix together the synthetic rubber and crude rubber, after thorough mixing thereof there is added the remaining ingredients. After further thorough mixing the mixture is molded into suitable form for storage battery containers. With plastic compounds of the type heretofore described, the curing temperature is preferably of the order of 320° F. to 350° F.

The final product exhibits unexpected characteristics. More particularly, it is substantially as hard at the pressing temperature, 320° F. to 350° F., as at room temperature. Stated differently, containers made of a compound in accordance with the present invention have little if any tendency to soften at the higher temperature. The bulge tendency is less than that encountered in battery containers of the type available on the market prior to the present invention, though of the same hardness. In plastic compositions of the prior art a reduction in the sulphur content resulted in a correspondingly softer end product. The same degree of change is not characteristic of the present composition. On the contrary, the sulphur content may be substantially reduced without a proportionally or correspondingly softer end product.

More particularly, with a sulphur content of 7.5 parts, the remaining ingredients being in accordance with the first example given above, the hardness on the Shore durometer scale D was 65 with a strength of 1170 lbs. per square inch, and an elongation of 4.16% the test being made on a sample .127" thick and having an area of .0627 square inches. The test was made at a temperature of 70° F. For a sulphur content of around 12 parts, the hardness on the Shore durometer scale D was 75 with a strength of 1473 lbs. per square inch and a per cent elongation of 2.25.

The foregoing comparison is the more striking by reference to impact tests conducted on specimens 2" x 4" x .250" mounted on supports 3" apart. For the material having a durometer hardness of 65 it was required that a 2.3 pound steel ball be dropped 4" in order to break the test specimen, whereas with the harder material corresponding with the durometer hardness of 75, the ball broke the specimen with a drop of but 1.5". Thus it will be seen the impact strength is high, and higher for containers of lower hardness on the durometer scale.

Plastic compounds in accordance with the present invention also appear to be unaffected by change in temperature, wide swings of temperature having been conducted on numerous containers without causing fracture thereof. They have also been found highly resistant to the action of sulphuric acid having a specific gravity of 1.300 at 150° F. They are also relatively light in weight, having a specific gravity of the order of 1.36, for the compound corresponding with the durometer hardness of 65, to 1.395 for the durometer hardness of 75.

From the foregoing it will be seen that with a relatively low sulphur content the plastic compound was adequately strong and stiff for use in containers in storage batteries.

A further unexpected property of the compound of the present invention is the greatly decreased time of curing. For containers made in accordance with prior art compositions, a curing time of the order of twenty minutes has been required, whereas with compounds made in accordance with the present invention the curing time has been of the order of six minutes. The greatly reduced curing time means a considerable saving in manufacturing cost and a higher output per day. The decreased time of curing has been found to be due not only to the use of the synthetic rubber and the preferred accelerators, but also due to the use of powdered anthracite coal as the filler. The powdered anthracite coal exhibits the property of being readily mixable with the other ingredients in contrast with carbon black and other forms of carbon which may be mixed with the other ingredients with exceedingly great difficulty; and which in the amounts needed for a filler, will reduce the cost materially, cannot be mixed with the requisite intimacy. Powdered bituminous coal has been found to be unsuitable as a filler.

The proportions of the ingredients, in the foregoing description and in the claims, have been given in parts by weight. The economy resulting from the use of powdered anthracite coal is realized when it exceeds about 100 parts and preferably is about 200 parts. The upper limit depends upon the amount of synthetic rubber utilized and as above indicated may be of the order of from 270 parts to 300 parts or more.

What is claimed is:

1. A composition of matter including a butadiene-styrene copolymer and powdered anthracite coal of size which will pass through an 80-mesh screen in parts above ten times the parts of said copolymer, sulphur in an amount sufficient to cure said copolymer and a plasticizer for said copolymer, said plasticizer having the following characteristics:

Viscosity at 100° F., 5800 cs.
Initial boiling point, °F. over 600 (over 400 at 1 mm.)
Specific gravity, 20/4 C., 1.016
Bromine No. (g. Br/100 g.), 26

2. A plastic compound comprising powdered anthracite coal from around 270 parts to 290 parts of size which will pass through an 80-mesh screen, crude rubber 7.5 to 10.5 parts, a butadiene-styrene copolymer 22.5 to 10.5 parts, sulphur 4 to 15 parts, a plasticizer for said crude rubber and said copolymer 41 to 53 parts, and an organic accelerator approximately 1 part, said plasticizer having the following characteristics:

Viscosity at 100° F., 5800 cs.
Initial boiling point, °F. over 600 (over 400 at 1 mm.)
Specific gravity, 20/4 C., 1.016
Bromine No. (g. Br/100 g.), 26

3. A process of making a heat-setting composition of short curing time comprising mixing together powdered anthracite coal from about 200 to 290 parts of size which will pass through an 80-mesh screen, a butadiene-styrene copolymer 10.5 to 22.5 parts, sulphur 4 to 15 parts, a plasticizer for said copolymer 41 to 53 parts, and an organic accelerator approximately 1 part, and applying heat and pressure to cure the mixture, said plasticizer having the following characteristics:

Viscosity at 100° F., 5800 cs.
Initial boiling point, °F. over 600 (over 400 at 1 mm.)
Specific gravity, 20/4 C., 1.016
Bromine No. (g. Br/100 g.), 26

4. The process of claim 3 in which there is added to the mix from 7.5 to 10.5 parts of crude rubber.

EDWIN R. LANING.

References Cited in the file of this patent

UNITED STATES PATENTS

| Number | Name | Date |
| --- | --- | --- |
| 2,253,608 | Bruce | Aug. 26, 1941 |
| 2,397,082 | Barker | Mar. 26, 1946 |
| 2,427,700 | Atkinson et al. | Sept. 23, 1947 |

FOREIGN PATENTS

| Number | Country | Date |
| --- | --- | --- |
| 108,037 | Australia | July 18, 1939 |

OTHER REFERENCES

"Compounding Ingredients for Rubber," 2nd ed., pub. 1947 by India Rubber World, N. Y., pages 169 and 195.